(12) United States Patent
Yu (10) Patent No.: US 9,479,678 B1
(45) Date of Patent: Oct. 25, 2016

(54) METHOD AND DEVICE FOR IMAGE PROCESSING, AND STORAGE MEDIUM

(71) Applicant: TENCENT TECHNOLOGY (SHENZHEN) COMPANY LIMITED, Shenzhen, Guangdong (CN)

(72) Inventor: Zijun Yu, Shenzhen (CN)

(73) Assignee: TENCENT TECHNOLOGY (SHENZHEN) COMPANY LIMITED, Shenzhen, Guangdong (CN)

(*) Notice: Subject to any disclaimer, the term of this patent is extended or adjusted under 35 U.S.C. 154(b) by 0 days.

(21) Appl. No.: 15/035,137

(22) PCT Filed: Nov. 3, 2014

(86) PCT No.: PCT/CN2014/090184
§ 371 (c)(1),
(2) Date: May 6, 2016

(87) PCT Pub. No.: WO2015/067153
PCT Pub. Date: May 14, 2015

(30) Foreign Application Priority Data

Nov. 7, 2013 (CN) .......................... 2013 1 0549189

(51) Int. Cl.
*G06K 9/00* (2006.01)
*H04N 1/44* (2006.01)
*G06T 1/00* (2006.01)

(52) U.S. Cl.
CPC ........... *H04N 1/4486* (2013.01); *G06T 1/0021* (2013.01)

(58) Field of Classification Search
CPC ............... H04N 1/4486; H04N 1/488; H04N 2201/3236; G06T 1/0021; G06T 2201/0052; G06T 2201/0064

USPC .................. 382/100; 380/200, 201, 245–247
See application file for complete search history.

(56) References Cited

U.S. PATENT DOCUMENTS 4,100,374 A * 7/1978 Jayant ...................... H04K 1/06
380/28
4,405,942 A * 9/1983 Block .................. H04N 7/1696
348/E7.059

(Continued)

FOREIGN PATENT DOCUMENTS

| CN | 102340688 A | 2/2012 |
|---|---|---|
| CN | 102609893 A | 7/2012 |

OTHER PUBLICATIONS

International Search Report and Written Opinion of the ISA, ISA/CN, Haidian District, Beijing, mailed Feb. 11, 2015.

*Primary Examiner* — Samir Ahmed
(74) *Attorney, Agent, or Firm* — Harness, Dickey & Pierce, P.L.C.

(57) ABSTRACT

Disclosed are a method and a device for image processing and a storage medium, and the method includes: cutting a first image to obtain at least two second images and first sequence information, wherein the first sequence information contains an order in which the at least two second images are spliced into the first image; rearranging the order contained in the first sequence information to obtain second sequence information containing an order in which the at least two second images are spliced into a third image; and splicing the at least two second images into the third image according to the second sequence information. With the disclosure, the original first image may be protected, because others cannot recover the first image from the third image via simple image processing technologies.

10 Claims, 7 Drawing Sheets

(56) References Cited

U.S. PATENT DOCUMENTS

| | | | | |
|---|---|---|---|---|
| 5,321,748 A | * | 6/1994 | Zeidler | H04N 7/1696 348/E7.059 |
| 5,375,168 A | * | 12/1994 | Kudelski | H04N 7/1696 348/E7.059 |
| 5,815,572 A | * | 9/1998 | Hobbs | H04N 7/1716 348/E7.059 |
| 7,221,761 B1 | | 5/2007 | Deshpande et al. | |
| 8,204,217 B2 | * | 6/2012 | Bjorkengren | H04L 9/34 380/28 |
| 2004/0252834 A1 | | 12/2004 | Nishimura et al. | |
| 2008/0025509 A1 | * | 1/2008 | Van De Ven | H04L 9/0637 380/210 |
| 2009/0169001 A1 | * | 7/2009 | Tighe | H04L 9/34 380/217 |

* cited by examiner

METHOD AND DEVICE FOR IMAGE PROCESSING, AND STORAGE MEDIUM

CROSS-REFERENCE TO RELATED APPLICATION

This application is a 371 National Phase application of PCT/CN2014/090184, filed on Nov. 3, 2014, which claims the benefit of and priority to Chinese Patent Application No. 201310549189.5 filed on Nov. 7, 2013 by Tencent Technology (Shenzhen) Co., Ltd. and entitled "METHOD AND DEVICE FOR IMAGE PROCESSING", the disclosures of which are incorporated herein by reference in theft entirety.

TECHNICAL FIELD

The present disclosure relates to the field of image processing, and in particular, to a method and a device for image processing, and a storage medium.

BACKGROUND

With the popularization of Internet technologies, a user may read contents of various magazines, newspapers, cartoons and the like presented in the form of images by accessing the Internet, which greatly enriches the people's life. For the copyright protection of the presented content, image encryption is generally performed on the presented content.

In the prior art, the image encryption may be performed on the presented content in such a way that: a watermark is inserted on an image corresponding to the presented content by an image processing technology. The inserted watermark may contain information such as the name of a website, copyright owner, etc., to prevent the others from saving the image from the accessed website for other purposes.

However, there exist at least the following problem in the prior art.

Even though an image may be encrypted by means of inserting a watermark in the image nowadays, the inserted watermark may be easily removed through an image processing technology, thus copyright violation may be caused to the copyright owner of the image.

SUMMARY

In order to solve the problem of the prior art, embodiments of the present invention provide a method and a device for image processing and a storage medium. These technical solutions are as follows.

In one aspect of the present disclosure, a method for image processing includes:
  cutting a first image to obtain at least two second images and first sequence information, wherein the first sequence information contains an order in which the at least two second images are spliced into the first image;
  rearranging the order of the at least two second images contained in the first sequence information to obtain second sequence information, which contains an order in which the at least two second images are spliced into a third image; and
  splicing the at least two second images into the third image according to the second sequence information.

In another aspect of the present disclosure, there provides a method for image processing, including:
  acquiring a third image and second sequence information, wherein the third image is formed by splicing at least two second images, and the second sequence information contains an order in which the at least two second images are spliced into the third image;
  rearranging the order of the at least two second images contained in the second sequence information, to obtain first sequence information which contains an order in which the at least two second images are spliced into a first image; and
  recovering the first image from the third image according to the first sequence information.

In another aspect of the present disclosure, there provides a device for image processing, including:
  a processing module, configured for cutting a first image to obtain at least two second images and first sequence information, wherein the first sequence information contains an order in which the at least two second images are spliced into the first image;
  a first arranging module, configured for rearranging the order of the at least two second images contained in the first sequence information to obtain second sequence information, which contains an order in which the at least two second images are spliced into a third image; and
  a first splicing module, configured for splicing the at least two second images into the third image according to the second sequence information.

In another aspect of the present disclosure, there provides a device for image processing, including:
  an acquiring module, configured for acquiring a third image and second sequence information, wherein the third image is formed by splicing at least two second images, and the second sequence information contains an order in which the at least two second images are spliced into the third image;
  a second arranging module, configured for rearranging the order of the at least two second images contained in the second sequence information to obtain first sequence information, wherein the first sequence information contains an order in which the at least two second images are spliced into a first image; and
  a second splicing module, configured for recovering the first image from the third image according to the first sequence information.

In another aspect of the present disclosure, there provides a storage medium containing computer-executable instructions, which, when executed by a computer processor, are configured to perform a method for image processing, and the method includes:
  cutting a first image to obtain at least two second images and first sequence information, wherein the first sequence information contains an order in which the at least two second images are spliced into the first image;
  rearranging the order of the at least two second images contained in the first sequence information to obtain second sequence information, which contains an order in which the at least two second images are spliced into a third image; and
  splicing the at least two second images into the third image according to the second sequence information.

In another aspect of the present disclosure, there provides a storage medium containing computer-executable instructions, which, when executed by a computer processor, are configured to perform a method for image processing, and the method includes:
  acquiring a third image and second sequence information, wherein the third image is formed by splicing at least two second images, and the second sequence information contains an order in which the at least two second images are spliced into the third image;

rearranging the order of the at least two second images contained in the second sequence information, to obtain first sequence information which contains an order in which the at least two second images are spliced into a first image; and recovering the first image from the third image according to the first sequence information.

The technical solutions of the embodiments of the present invention has the following beneficial effects:

As such, a first image is cut to obtain at least two second images, and the order of the at least two second images is rearranged, so that a third image is generated according to the order rearranged. Therefore, the original first image may be protected, because others cannot recover the first image via simple image processing technologies.

BRIEF DESCRIPTION OF THE DRAWINGS

In order to more clearly illustrate the technical solutions according to the embodiments of the present invention, the drawings used in the description of the embodiments will be briefly introduced below. Apparently, the drawings used in the description below illustrate only partial embodiments of the present invention, and other drawings may be obtained by one of ordinary skills in the art in light of these described drawings without creative work.

DETAILED DESCRIPTION OF THE EMBODIMENTS

In order to make objects, technical solutions and advantages of the present invention more apparent, the embodiments of the present invention will be further described in detail below in conjunction with the drawings.

Figure 1:
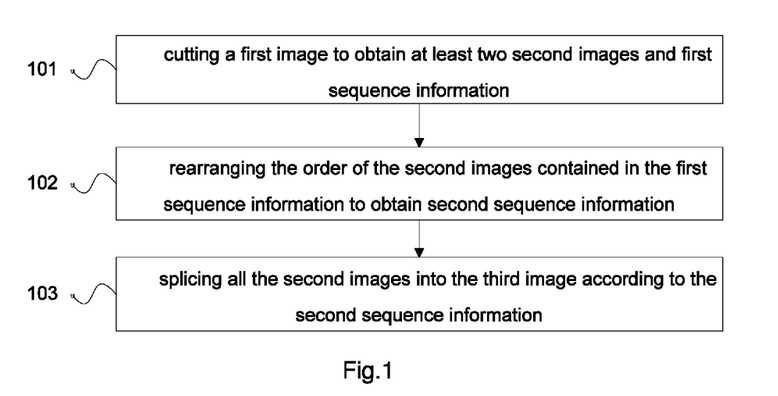
FIG. 1 is a flow chart of a method for image processing according to an embodiment of the present invention.

An embodiment of the present invention provides a method for image processing. Referring to FIG. 1, the method includes Steps 101 to 103 below.

Step 101: cutting a first image to obtain at least two second images and first sequence information, where the first sequence information contains an order in which the at least two second images are spliced into the first image.

Step 102: rearranging the order of the second images contained in the first sequence information to obtain second sequence information, where the second sequence information contains an order in which the at least two second images are spliced into a third image.

Step 103: splicing all the second images into the third image according to the second sequence information.

In this embodiment of the present invention, a first image is cut to obtain at least two second images, and the order of the at least two second images is rearranged, so that a third image is generated according to the order rearranged. Therefore, the original first image may be protected, because others cannot recover the first image via simple image processing technologies.

Figure 2:
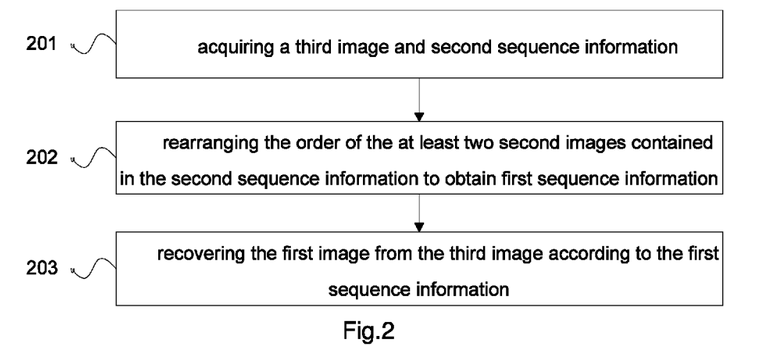
FIG. 2 is a flow chart of a method for image processing according to another embodiment of the present invention.

Another embodiment of the present invention provides a method for image processing. Referring to FIG. 2, the method includes Steps 201 to 203 below.

Step 201: acquiring a third image and second sequence information, where the third image is formed by splicing at least two second images, and the second sequence information contains an order in which the at least two second images are spliced into the third image.

Step 202: rearranging the order of the at least two second images contained in the second sequence information to obtain first sequence information, where the first sequence information contains an order in which the at least two second images are spliced into a first image.

Step 203: recovering the first image from the third image according to the first sequence information.

In this embodiment of the present invention, the order of the second images constituting the third image is rearranged to obtain an order in which the second images are spliced into a first image, so that the original first image may be recovered from the third image according to the obtained order. Therefore, the original first image may be protected, because others cannot recover the first image via simple image processing technologies.

Figure 3:
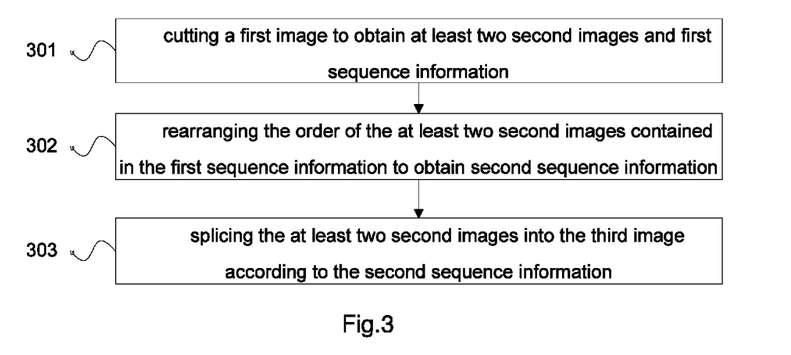
FIG. 3 is a flow chart of an image encryption process in a method for image processing according to still another embodiment of the present invention.

Another embodiment of the present invention provides a method for image processing, referring to FIG. 3.

It should be noted that, in this embodiment of the present invention, the description below will be given by an example where both the image encryption process and the image decryption process are performed in a terminal.

Particularly, the method includes Steps 301 to 303 below.

Step 301: cutting a first image to obtain at least two second images and first sequence information, where the first sequence information contains an order in which the at least two second images are spliced into the first image.

To allow a user to browse an image on a web page via a browser, a normal image without being encrypted is downloaded by the browser from a server. When the user attempts to save the image (which is referred to as a first image for ease of description hereinafter), a process of encryption the first image is triggered. At this time, the user may be in a non-login state, or the user has login the server but identity information of the user does not meet a condition of viewing the saved first image. Here, the condition of viewing the saved first image may be that: the identity information of the user is determined on the server as preset identity information that meets the condition of viewing the saved first image, for example, the identity information of the user indicates the user is a paid user.

Thus, the process of triggering Step 301 is as follows.

When a user attempts to save the first image, the step of cutting the first image is performed.

Specifically, a user may issue a command of saving the first image. For example, the user right-clicks on the first image and selects the option "Save As" in the pop up menu. Here, the manner of attempting to save an image is not limited.

Figure 4:
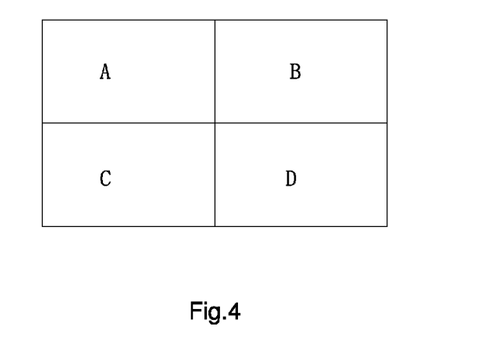
FIG. 4 is a schematic diagram of an image cutting manner in the method for image processing according to the still another embodiment of the present invention.

The preset cutting rule is described below by an example of a rectangular first image. The midpoint of each side of the rectangle is selected, and the first image is cut along a line passing through the midpoint of each side and the midpoint of the opposite side thereof, thus four second images are obtained, as shown in FIG. 4. Thereby, the first image is cut into four second images, each of which is provided with a corresponding identifier, for example, the top-left second image corresponds to an identifier A, the top-right second image corresponds to an identifier B, the bottom-left second image corresponds an identifier C, and the bottom-right second image corresponds to an identifier D. Then, the four second images are ordered to assign a sequence number to each of the second images. For example, starting from the top-left second image, these second images are sequentially numbered in a clockwise or anticlockwise manner to obtain the corresponding sequence number of each second image; or, in another ordering mode, starting from the top-left second image, the upper row of the second images are first numbered, and then the lower row of the second images are numbered starting from the bottom-left second image. Here, the precedence order of the assigned sequence numbers represents the order in which the second images are spliced into the first image, i.e., the first sequence information, thus the precedence order of the sequence numbers in the corresponding first sequence information will be A:1, B:2, C:3 and D:4, that is, the second image with an identifier A corresponds to a sequence number 1, the second image with an identifier B corresponds to a sequence number 2, the second image with an identifier C corresponds to a sequence number 3, and the second image with an identifier D corresponds to a sequence number 4. Herein, the way of ordering the images is not limited in the embodiments of the present invention. For example, as shown in FIG. 4, the second images are ordered in the another ordering mode.

Figure 5:
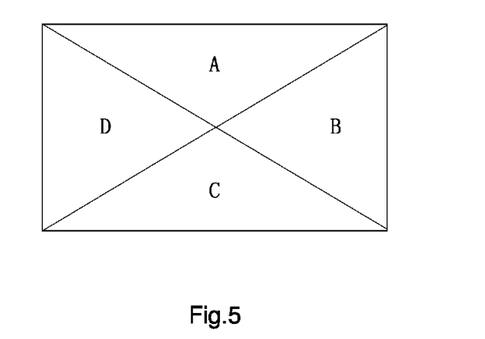
FIG. 5 is a schematic diagram of another image cutting manner in the method for image processing according to the still another embodiment of the present invention.

Further, the cutting rule is not limited in the embodiment of the present invention. For example, the cutting rule may define that the first image is cut along the two diagonals thereof to obtain four second images. As shown in FIG. 5, starting from the uppermost second image, the second images are ordered and a sequence number is assigned to each second image after ordering, where the precedence order of the assigned sequence numbers represents the order in which the second images are spliced into the first image, i.e., the first sequence information.

Step 302: rearranging the order of the at least two second images contained in the first sequence information to obtain second sequence information, where the second sequence information contains an order in which the at least two second images are spliced into a third image.

In this step, the sequence number of each second image is regenerated at random according to a rule of rearranging the order of the sequence numbers in the first sequence information. Herein, the generated second sequence information cannot be the same as the first sequence information.

Illustration will be given below by taking the instance of FIG. 4 in Step 301 as an example, where the sequence corresponding to the first sequence information is A:1, B:2, C:3 and D:4, and the second sequence information after the rearrangement is A:4, B:1, C:2 and D:3, that is, the second image with an identifier A corresponds to a sequence number 4, the second image with an identifier B corresponds to a sequence number 1, the second image with an identifier C corresponds to a sequence number 2, and the second image with an identifier D corresponds to a sequence number 3.

Step 303: splicing the at least two second images into the third image according to the second sequence information.

According to the arrangement order in the second sequence information, the original first second image A is arranged at the fourth location, i.e., the bottom-right location; the original second image B is arranged at the first location, i.e., the top-left location; the original third second image C is arranged at the second location, i.e., the top-right location; and the original fourth second images D is arranged at the third location, i.e., the bottom-left location.

Optionally, in generating the third image, reversible image processing such as reverse color transform, inversion transform or filter transform may be further performed on the image obtained by combining the second images. Thus, Step 303 may further include:

Splicing, according to the order in the second sequence information by which the at least two second images are spliced into a third image, the at least two second images into an image, which is subjected to reversible image processing to generate the third image.

As such, second images are generated from cutting the original first image, then the second images are disordered and recombined into a third image, and the third image is saved according to a storage path selected by a user. Further, a correspondence between an identifier of the obtained third image and the second sequence information may be uploaded by a terminal to a server for storage. If the identity information of the user is accepted by the server, the second sequence information may be returned to the terminal by the server, and the third image can be decrypted using the second sequence information; or, the correspondence between the identifier of the third image obtained and the second sequence information may also be stored locally in the terminal, and a message indicating that the identity information of the user is accepted by the server may be sent to the terminal by the server, so that the terminal may decrypt the third image according to the second sequence information stored therein.

Thus, after this step, the method further includes: storing a correspondence between the identifier of the third image and the second sequence information.

Although the user issues a command for storing the first image, the image actually stored in the local hard disk is the encrypted third image; to view the actual first image in the local hard disk, the user is required to login the server, so that the identity information of the user may be accepted by the server to decrypt the third image; or, an authentication operation is performed on the identity information of the user, so that the identity information of the user may be accepted by the server to decrypt the third image.

Figure 6:
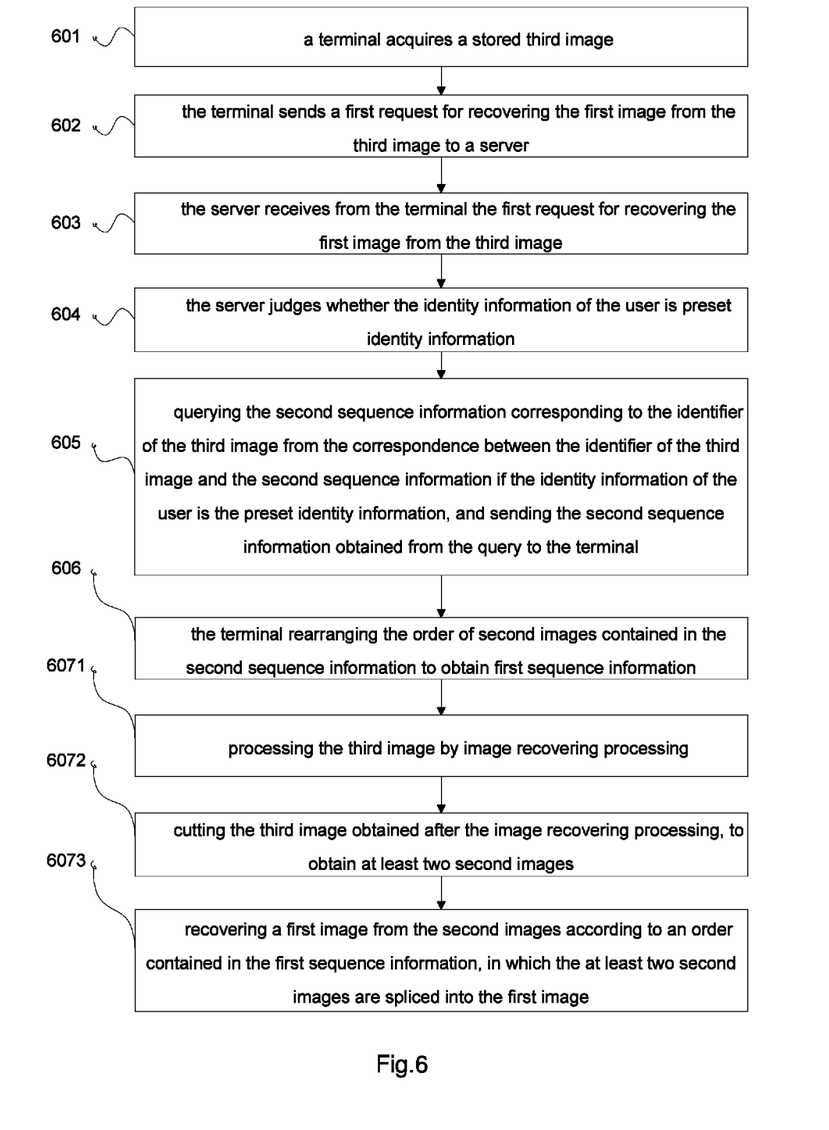
FIG. 6 is a flow chart of an image decryption process in the method for image processing according to the still another embodiment of the present invention.

Correspondingly, in this embodiment of the present invention, a decryption process on the third image is shown in FIG. 6, and the decryption method includes Steps 601 to 607 below.

Step 601: acquiring, by a terminal, a stored third image.

Step 602: sending, by the terminal, a first request for recovering the first image from the third image to a server, where the first request carries identity information of a user and an identifier of the third image.

Step 603: receiving from the terminal, by the server, the first request for recovering the first image from the third image, where the first request contains the identity information of the user and the identifier of the third image.

Step 604: judging, by the server, whether the identity information of the user is preset identity information.

Here, the preset identity information may indicate a user as an authenticated user.

Step 605: querying the second sequence information corresponding to the identifier of the third image from the correspondence between the identifier of the third image and the second sequence information if the identity information of the user is the preset identity information, and sending the second sequence information obtained from the query to the terminal.

Step 606: rearranging, by the terminal, the order of second images contained in the second sequence information to obtain first sequence information, where the first sequence information contains an order in which the second images are spliced into a first image.

Again, the second sequence information in Step 302 (i.e. A:4, B:1, C:2 and D:3) is taken as an example, then the location of each of the second images in the third image is obtained. At this time, the second sequence information is rearranged according to the order ABCD of the identifiers of the second images, and an order, i.e., A:1, B:2, C:3 and D:4, in which the second images are spliced into the first image is obtained.

Step 607: recovering, by the terminal, the first image from the third image according to the first sequence information.

Particularly, Step 607 specifically includes:

Step 6071: processing the third image by image recovering processing.

If reversible image processing is performed on an image obtained from combining the second images in generating the third image, then when a reverse operation is performed, image processing reverse to the reversible image processing is performed in a second processing mode on the third image. Where, the image recovering processing is selected as inverse to the reversible image processing employed in Step 303.

Step 6072: cutting the third image obtained after the image recovering processing, to obtain at least two second images.

Here, the third image is cut in a cut processing mode the same as the cut processing mode employed in Step 301.

Step 6073: recovering a first image from the second images according to an order contained in the first sequence information, in which the at least two second images are spliced into the first image.

The second images are spliced again according to the first sequence information; as such, the decryption processing on the third image is completed, and the first image, i.e., a normally displayed image, is obtained.

In this embodiment of the present invention, a first image is cut to obtain at least two second images, and the order of the at least two second images is rearranged, so that a third image is generated according to the order rearranged. To decrypt the third image, the third image is cut into at least two second images, and the order of the obtained at least two second images is rearranged to recover the original first image. Therefore, the original first image may be protected, because others cannot recover the first image via simple image processing technologies.

Figure 7:
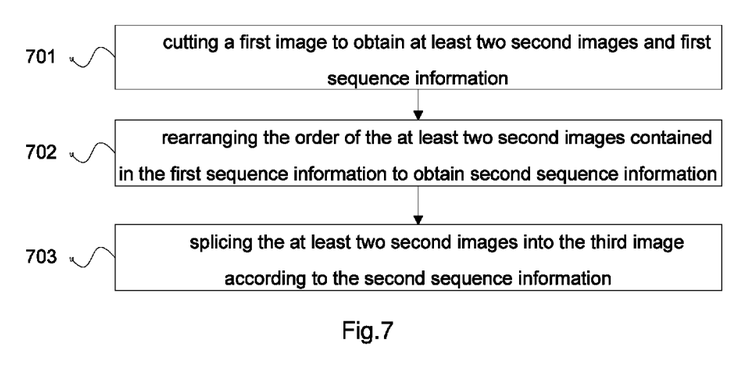
FIG. 7 is a flow chart of an image encryption process in a method for image processing according to yet another embodiment of the present invention.

Another embodiment of the present invention provides a method for image processing, referring to FIG. 7.

It should be noted that, in this embodiment of the present invention, the description will be given below by an example where the image encryption process is conducted on a server and the image decryption process is conducted on a terminal. A part of steps in the method are the same as those in the first embodiment described as above, and no further description thereof will be given here.

The method may include Steps 701 to 703.

Step 701: cutting a first image to obtain at least two second images and first sequence information, where the first sequence information contains an order in which the at least two second images are spliced into the first image.

Since the first image saved on the server may be encrypted in advance, Steps 701 to 703 are performed on the server.

Step 702: rearranging the order of the at least two second images contained in the first sequence information to obtain second sequence information, which contains an order in which the at least two second images are spliced into a third image.

Step 703: splicing the at least two second images into the third image according to the second sequence information.

After this step, the method may further include: saving a correspondence among an identifier of the first image, an identifier of the third image and the second sequence information.

Optionally, in generating the third image, reversible image processing such as reverse color transform, inversion transform and filter transform may be further performed on the image obtained from combining the second images. Thus, Step 703 may further include:

splicing the second images into an image according to the order contained in the second sequence information, in which the at least two second images are spliced into a third image, and generating the third image by performing reversible image processing on the image obtained from splicing the second images.

Figure 8:
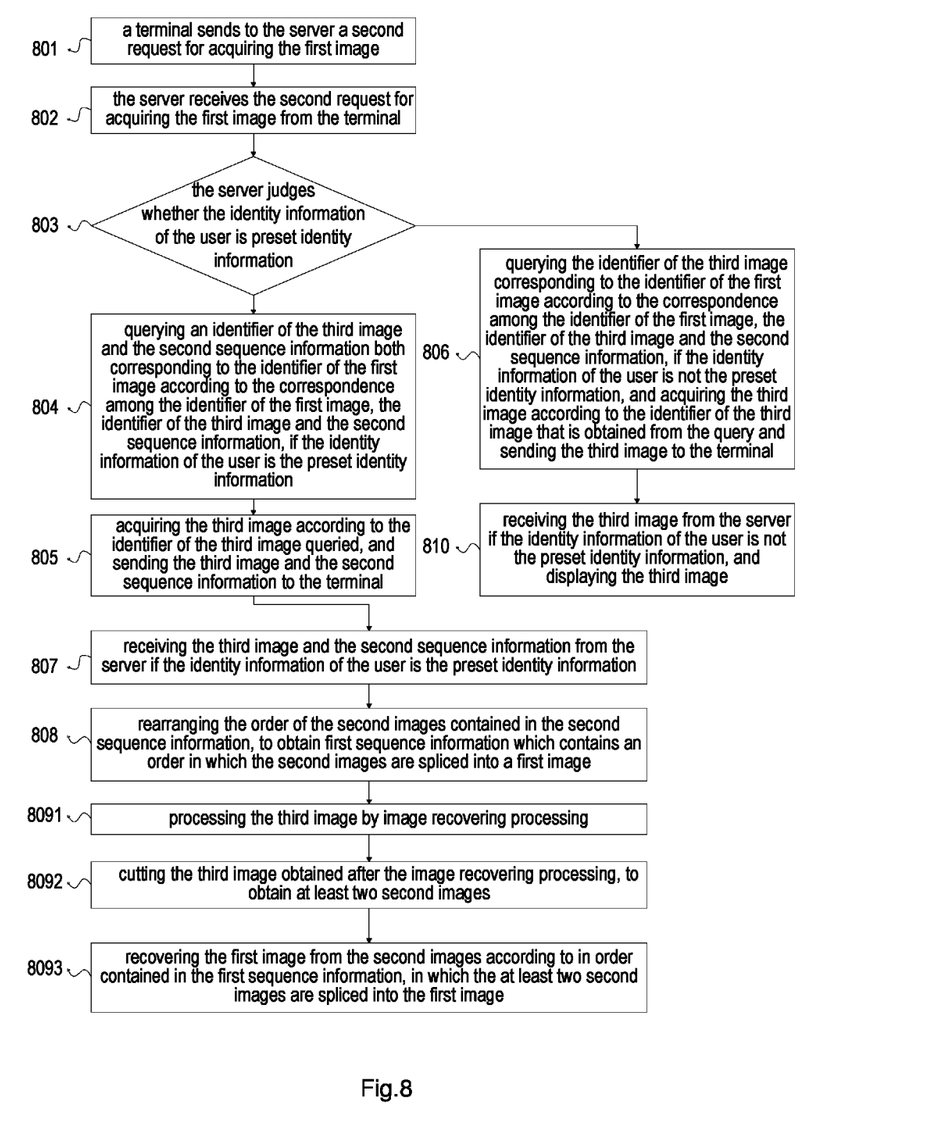
FIG. 8 is a flow chart of an image decryption process in the method for image processing according to the yet another embodiment of the present invention.

In this embodiment of the present invention, the method may further include: decrypting the obtained third image on a terminal after encrypting the first image on the server; as shown in FIG. 8, the method includes Steps 801 to 810.

Step 801: sending to the server, by a terminal, a second request for acquiring the first image, where the second request carries the identity information of a user and the identifier of the first image.

When a user accesses a network and attempts to view the first image in the network, a second request for acquiring the first image will be sent to the server. At this time, if the user is in a login state, the identity information of the user and the identifier of the first image are sent to the server via the second request, where the identifier of the first image may be a hyperlink address. In another case, the user may be in a non-login state, thus the field of user identity information in the sent second request is null.

Step 802: receiving, by the server, the second request for acquiring the first image that is sent by the terminal, where the second request contains the identity information of the user and the identifier of the first image.

Step 803: judging, by the server, whether the identity information of the user is preset identity information.

Where, the preset identity information may indicate the user as an authenticated user.

Step 804: querying an identifier of the third image and the second sequence information both corresponding to the identifier of the first image according to the correspondence among the identifier of the first image, the identifier of the third image and the second sequence information, if the identity information of the user is the preset identity information.

Step 805: acquiring the third image according to the identifier of the third image queried, and sending the third image and the second sequence information to the terminal.

Step 806: querying the identifier of the third image corresponding to the identifier of the first image according to the correspondence among the identifier of the first image, the identifier of the third image and the second sequence information, if the identity information of the user is not the preset identity information, and acquiring the third image according to the identifier of the third image that is obtained from the query and sending the third image to the terminal.

If the identity information of the user is not the preset identity information, the third image is received and displayed by the terminal. In this case, an encrypted image before decryption is viewed by the user, and the method proceeds with Step 810.

Step 807: receiving the third image and the second sequence information from the server if the identity information of the user is the preset identity information.

Step 808: rearranging the order of the second images contained in the second sequence information, to obtain first sequence information which contains an order in which the second images are spliced into a first image.

Step 809: recovering the first image from the third image according to the first sequence information.

Step 809 may specifically include:

Step 8091: processing the third image by image recovering processing;

Step 8092: cutting the third image obtained after the image recovering processing, to obtain at least two second images; and Step 8093: recovering the first image from the second images according to in order contained in the first sequence information, in which the at least two second images are spliced into the first image.

Step 810: receiving the third image from the server if the identity information of the user is not the preset identity information, and displaying the third image.

In this embodiment of the present invention, a first image is cut to obtain at least two second images, and the order of the at least two second images is rearranged, so that a third image is generated according to the order rearranged. To decrypt the third image, the third image is cut into at least two second images, and the order of the obtained at least two second images is rearranged to recover the original first image. Therefore, the original first image may be protected, because others cannot recover the first image via simple image processing technologies.

Figure 9:
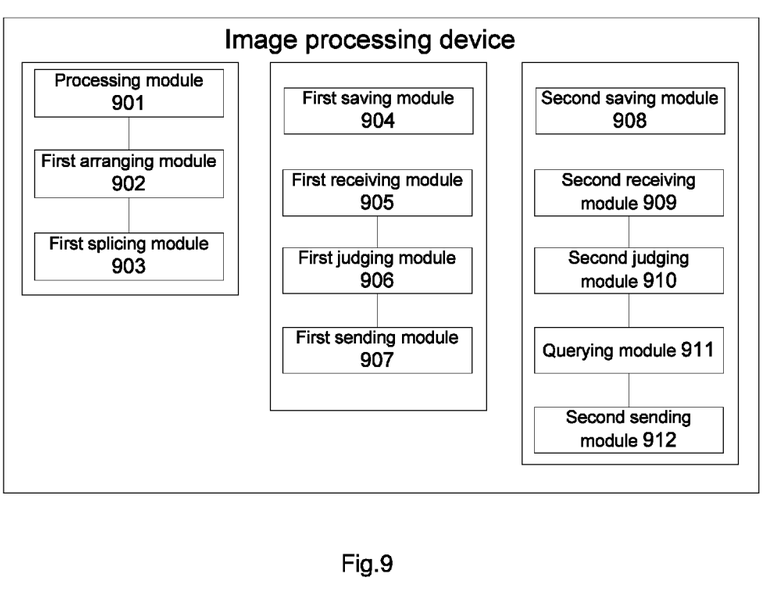
FIG. 9 is a structural representation of a device for image processing according to an embodiment of the present invention.

Another embodiment of the present invention provides a device for image processing, referring to FIG. 9, and the device includes:

- a processing module 901, configured for cutting a first image to obtain at least two second images and first sequence information, where the first sequence information contains an order in which the at least two second images are spliced into the first image.
- a first arranging module 902, configured for rearranging the order of the at least two second images contained in the first sequence information to obtain second sequence information, which contains an order in which the at least two second images are spliced into a third image; and
- a first splicing module 903, configured for splicing the at least two second images into the third image according to the second sequence information.

The device may further include:
- a first saving module 904, configured for saving a correspondence between the identifier of the third image and the second sequence information.

The device may further include:
- a first receiving module 905, configured for receiving from a terminal a first request for recovering the first image from the third image, where the first request contains the identity information of a user and the identifier of the third image;
- a first judging module 906, configured for judging whether the identity information of the user is preset identity information; and
- a first sending module 907, configured for querying the second sequence information corresponding to the identifier of the third image according to the correspondence between the identifier of the third image and the second sequence information, if the identity information of the user is the preset identity information, and sending the second sequence information obtained from the query to the terminal.

The device may further include:
- a second saving module 908, configured for saving a correspondence among the identifier of the first image, the identifier of the third image and the second sequence information.

The device may further includes:
- a second receiving module 909, configured for receiving a second request for acquiring the first image from a terminal, where the second request contains the identity information of a user and the identifier of the first image;
- a second judging module 910, configured for judging whether the identity information of the user is preset identity information;
- a querying module 911, configured for querying the identifier of the third image and the second sequence information both corresponding to the identifier of the first image according to the correspondence among the identifier of the first image, the identifier of the third image and the second sequence information, if the identity information of the user is the preset identity information; and
- a second sending module 912, configured for acquiring the third image according to the identifier of the third image obtained from the query, and sending the third image and the second sequence information to the terminal.

The first splicing module 903 is specifically configured for splicing the at least two second images into an image according to the order, in which the at least two second images are spliced into the third image, contained in the second sequence information, and performing reversible image processing on the image obtained from the splicing to generate the third image.

In this embodiment of the present invention, a first image is cut to obtain at least two second images, and the order of the at least two second images is rearranged, so that a third image is generated according to the order rearranged. Therefore, the original first image may be protected, because others cannot recover the first image via simple image processing technologies.

Figure 10:
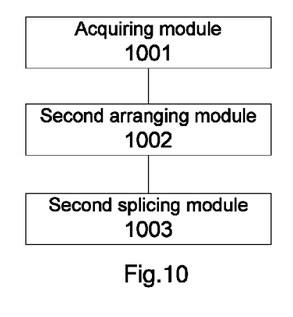
FIG. 10 is a structural representation of a device for image processing according to another embodiment of the present invention.

Another embodiment of the present invention provides a device for image processing, referring to FIG. 10, and the device includes:

- an acquiring module 1001, configured for acquiring a third image and second sequence information, where the third image is formed by splicing at least two second images, and the second sequence information contains an order in which the at least two second images are spliced into the third image;
- a second arranging module 1002, configured for rearranging the order of the at least two second images contained in the second sequence information to obtain first sequence information, which contains an order in which the at least two second images are spliced into the first image; and
- a second splicing module 1003, configured for recovering the first image from the third image according to the first sequence information.

The acquiring module 1001 may include:
- an acquiring unit, configured for acquiring a store third image;
- a first sending unit, configured for sending a first request for recovering the first image from the third image to a server, where the first request carries the identity information of a user and the identifier of the third image; and
- a first receiving unit, configured for receiving second sequence information returned by the server.

The acquiring module 1001 may include:
- a second sending unit, configured for sending a second request for acquiring the first image to the server, where the second request carries the identity information of a user and the identifier of the first image; and
- a second receiving unit, configured for receiving a third image and second sequence information from the server.

The second splicing module 1003 may include:
- a first processing unit, configured for conducting image recovering processing on the third image;
- a second processing unit, configured for cutting the third image after the image recovering processing, to obtain at least two second images; and
- a third processing unit, configured for recovering a first image from the second images according to the order, in which the at least two second images are spliced into the first image, contained in the first sequence information.

In the embodiment of the present invention, to decrypt the third image, the third image is cut into at least two second images, and the order of the obtained at least two second images is rearranged to recover the original first image. Therefore, the original first image may be protected, because others cannot recover the first image via simple image processing technologies.

It should be noted that, for the above each embodiment, by configuring the related information in advance, an image encrypting end can be aware of: the mode of cutting a first image to obtain second images, a first rule for ordering the second images to obtain first sequence information, and a second rule for rearranging the second images to obtain second sequence information; likewise, by configuring the related information in advance, an image decrypting end can be aware of: an inverse rule inverse to the above second rule, so that the order contained in the second sequence information may be rearranged to obtain the first sequence information; a mode of cutting the first image, by which the third image may be cut in this mode to obtain the at least two second images; and an inverse rule inverse to the above first rule, by which the obtained at least two second images may be spliced into the first image according to the first sequence information.

Figure 11:
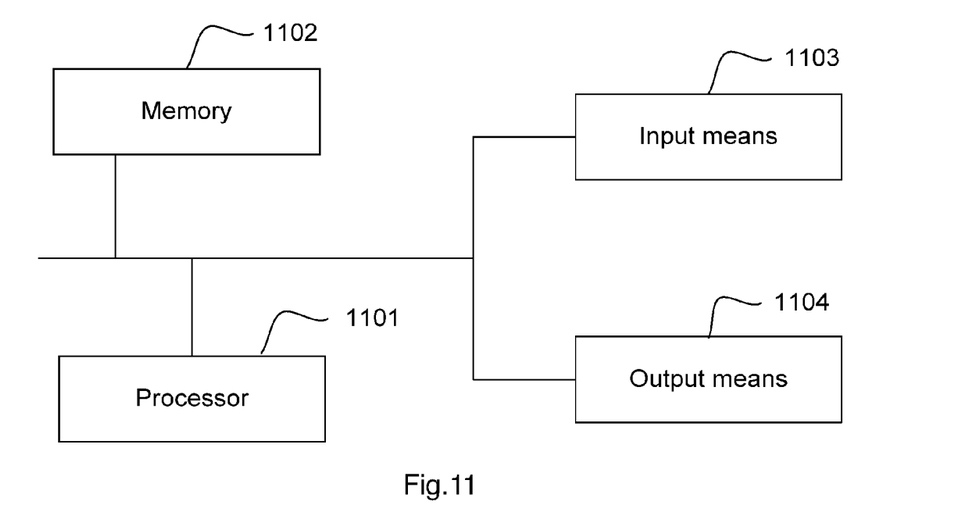
FIG. 11 is a structural representation of a terminal device according to embodiments of the present invention.

Referring to FIG. 11, still another embodiment of the present invention provides a terminal device, which includes a processor 1101, a memory 1102, input means 1103 and output means 1104. There may be one or more processors 1101 in the terminal device, while FIG. 11 shows merely one processor 1101 as an example. The processor 1101, the memory 1102, the input means 1103 and the output means 1104 in the terminal device may be connected via a bus or in another way, while FIG. 11 shows the connection made via buses as an example.

As a computer-readable storage medium, the memory 1102 may be used for storing a software program, a computer-executable program or a module, for example, program instructions and/or modules (for example, the processing module 901, the first arranging module 902 and the first splicing module 903 in the device for image processing shown in FIG. 9) corresponding to the image processing method in the embodiments of the present invention. By running the software program, instructions and modules stored in the memory 1102, the processor 1101 may execute various functional applications and data processing on the terminal device, i.e., implement the image processing method shown in the above FIG. 1, FIG. 3 and FIG. 7.

The memory 1102 may mainly include a program storing area and a data storing area, where, the program storing area may store an operating system and an application program required for implementing at least one function; the data storing area may store data established according to the use of a server, etc. Additionally, the memory 1102 may include a high speed random access memory or a non-volatile memory, for example, at least one magnetic disc memory device, flash memory device or other non-volatile solid-state memory devices. In some instances, the memory 1102 may further include a memory that is configured remotely relative to the processor 1101, and the remote memory may be connected to a server via a network. The instance of the above network includes, but is not limited to, Internet, Intranet, local area network, mobile communication network and a combination thereof.

The input means 1103 may be used for receiving inputted digital or character information, and generating a key signal input related to user settings and functional control of the terminal. The output means 1104 may include a display device such as display screen.

The processor 1101 may be configured to perform steps of: cutting a first image to obtain at least two second images and first sequence information, where the first sequence information contains an order in which the at least two second images are spliced into the first image; rearranging the order of the at least two second images contained in the first sequence information to obtaining second sequence information, where the second sequence information contains an order in which the at least two second images are spliced into a third image; and splicing the at least two second images into the third image according to the second sequence information.

Further, the processor 1103 may be further configured to perform steps of: saving a correspondence between the identifier of the third image and the second sequence information in the memory 1102.

Further, the processor 1103 may be further configured to perform steps of: receiving from a terminal a first request for recovering the first image from the third image, where the first request contains the identity information of a user and the identifier of the third image; judging whether the identity information of the user is preset identity information; and querying the second sequence information corresponding to the identifier of the third image according to the correspondence between the identifier of the third image and the second sequence information if the identity information of the user is the preset identity information, and sending the second sequence information obtained from the query to the terminal.

Further, the processor 1103 may be further configured to perform a step of: saving a correspondence among the identifier of the first image, the identifier of the third image and the second sequence information in the memory 1102.

Further, the processor 1103 may be further configured to perform steps of: receiving a second request for acquiring the first image from a terminal, where the second request contains the identity information of a user and the identifier of the first image; judging whether the identity information of the user is preset identity information; querying the identifier of the third image and the second sequence information both corresponding to the identifier of the first image according to the correspondence among the identifier of the first image, the identifier of the third image and the second sequence information, if the identity information of the user is the preset identity information; and acquiring the third image according to the identifier of the third image queried, and sending the third image and the second sequence information to the terminal.

Further, the processor 1103 is configured to splice the second images into the third image by specifically performing a step of: according to the order, in which the second images are spliced into a third image, contained in the second sequence information, splicing the second images into an image, which is subjected to reversible image processing to generate the third image.

In this embodiment of the present invention, a first image is cut to obtain at least two second images, and the order of the at least two second images is rearranged, so that a third image is generated according to the order rearranged. Therefore, the original first image may be protected, because others cannot recover the first image via simple image processing technologies.

Still referring to FIG. 11, yet another embodiment of the present invention provides a terminal device, which includes a processor 1101, a memory 1102, input means 1103 and output means 1104. There may be one or more processors 1101 in the terminal device, and FIG. 11 shows merely one processor 1101 for example. The processor 1101, the memory 1102, the input means 1103 and the output means 1104 in the terminal device may be connected via a bus or in other manners, and FIG. 11 shows the connection as a bus connection, for example.

As a computer-readable storage medium, the memory 1102 may be used for storing a software program, a computer-executable program and a module, for example, program instructions and/or modules (for example, the acquiring module 1001, the second arranging module 1002 and the second splicing module 1003 in the device for image processing shown in FIG. 10) corresponding to the image processing method in the embodiments of the present invention. By running the software program, instructions and modules stored in the memory 1102, the processor 1101 may execute various functional applications and data processing of the terminal device, i.e., implement the above image processing method shown in FIG. 2.

The memory 1102 may mainly include a program storing area and a data storing area. The program storing area may store an operating system and an application program for at least one function, and the data storing area may store the data established according to the use of a server. Additionally, the memory 1102 may include a high-speed random access memory or a non-volatile memory, for example, at least one magnetic disc memory device, flash memory device, or other non-volatile solid-state memory devices. In some instances, the memory 1102 may further include a memory that is configured remotely relative to the processor 1101, and the remote memory may be connected to a server via a network. The instance of the network includes, but is not limited to, Internet, Intranet, local area network, mobile communication network and a combination thereof.

The input means 1103 may be used for receiving inputted digital or character information, and generating a key signal input related to user settings and functional control of the terminal. The output means 1104 may include a display device such as display screen.

The processor 1101 may be configured to perform steps of: acquiring a third image and second sequence information, where the third image is formed by splicing at least two second images, and the second sequence information contains an order in which the at least two second images are spliced into the third image; rearranging the order of the at least two second images contained in the second sequence information, to obtain first sequence information, which contains an order in which the at least two second images are spliced into a first image; and recovering the first image from the third image according to the first sequence information.

Further, the processor 1101 is configured to acquire the third image and the second sequence information by specifically performing steps of: acquiring a stored third image; sending to a server a first request for recovering the first image from the third image, where the first request carries the identity information of a user and the identifier of the third image; and receiving second sequence information from the server.

Further, the processor 1101 is configured to acquire the third image and the second sequence information by specifically performing steps of: sending a second request for acquiring the first image to the server, where the second request carries the identity information of a user and the identifier of the first image; and receiving a third image and second sequence information from the server.

Further, the processor 1101 is configured to recover the first image from the third image by specifically performing steps of: conducting image recovering processing on the third image; cutting the third image after the image recovering processing, to obtain at least two second images; and recovering the first image from the at least two second images according to an order, in which the at least two second images are spliced into the first image, contained in the first sequence information.

In this embodiment of the present invention, the third image is cut into at least two second images, and the order of the obtained at least two second images is rearranged to recover the original first image. Therefore, the original first image may be protected, because others cannot recover the first image via simple image processing technologies.

An embodiment provides a storage medium containing computer-executable instructions, which, when executed by a computer processor, are configured to perform a method for image processing, and the method includes:

cutting a first image to obtain at least two second images and first sequence information, where the first sequence information contains an order in which the at least two second images are spliced into the first image;

rearranging the order of the at least two second images contained in the first sequence information to obtain second sequence information, where the second sequence information contains an order in which the at least two second images are spliced into a third image; and splicing the at least two second images into the third image according to the second sequence information.

Further, after splicing the at least two second images into the third image, the method further includes: saving a correspondence between an identifier of the third image and the second sequence information.

Further, after splicing the at least two second images into the third image, the method further includes:

receiving from a terminal a first request for recovering the first image from the third image, where the first request contains the identity information of a user and the identifier of the third image;

judging whether the identity information of the user is preset identity information; and querying the second sequence information corresponding to the identifier of the third image according to the correspondence between the identifier of the third image and the second sequence information if the identity information of the user is the preset identity information, and sending the second sequence information obtained from the query to the terminal.

Further, after splicing the at least two second images into the third image, the method further includes:

saving a correspondence among the identifier of the first image, the identifier of the third image and the second sequence information.

Further, after splicing the at least two second images into the third image, the method further includes:

receiving a second request for acquiring the first image from a terminal, where the second request contains the identity information of a user and the identifier of the first image;

judging whether the identity information of the user is preset identity information;

querying the identifier of the third image and the second sequence information both corresponding to the identifier of the first image according to the correspondence among the identifier of the first image, the identifier of the third image and the second sequence information, if the identity information of the user is the preset identity information; and acquiring the third image according to the identifier of the third image obtained from the query, and sending the third image and the second sequence information to the terminal.

Further, the splicing the at least two second images into the third image according to the second sequence information includes:

according to an order contained in the second sequence information, in which the at least two second images are spliced into a third image, splicing the at least two second images into an image, which is then subjected to reversible image processing to generate the third image.

Yet an embodiment provides a storage medium containing computer-executable instructions, which, when executed by a computer processor, are configured to perform a method for image processing, and the method includes:

acquiring a third image and second sequence information, where the third image is formed by splicing at least two second images, and the second sequence information contains an order in which the at least two second images are spliced into the third image;

rearranging the order of the at least two second images contained in the second sequence information, to obtain first sequence information, which contains an order in which the at least two second images are spliced into a first image; and recovering the first image from the third image according to the first sequence information.

Further, the acquiring a third image and second sequence information includes:

acquiring a store third image;

sending to a server a first request for recovering the first image from the third image, where the first request carries the identity information of a user and the identifier of the third image; and receiving second sequence information from the server.

Further, the acquiring a third image and second sequence information includes:

sending a second request for acquiring the first image to the server, where the second request carries the identity information of a user and the identifier of the first image; and receiving the third image and second sequence information from the server.

Further, the recovering the first image from the third image according to the first sequence information includes:

performing image recovering processing on the third image;

cutting the third image after the image recovering processing, to obtain at least two second images; and recovering the first image from the second images according to an order contained in the first sequence information, in which the at least two second images are spliced into the first image.

It may be understood by one of ordinary skills in the art that, all or a part of the steps for implementing the above embodiments may be accomplished via hardware, or they may be accomplished by instructing the related hardware via a program, where the program may be stored in a computer-readable storage medium, and the storage medium mentioned above may be a read-only memory, a magnetic disc or a compact disc, etc.

The above description only shows some preferred embodiments of the present invention, rather than limiting the invention. All modifications, equivalent substitutions and improvements made without departing from the spirit and scope of the present invention should fall into the protection scope of the present invention.

What is claimed is:

1. A method for image processing, comprising:

cutting a first image to obtain at least two second images and first sequence information, wherein the first sequence information contains an order in which the at least two second images are spliced into the first image;

rearranging the order of the at least two second images contained in the first sequence information to obtain second sequence information, which contains an order in which the at least two second images are spliced into a third image; and splicing the at least two second images into the third image according to the second sequence information;

wherein, after the splicing the at least two second images into the third image, the method further comprises:

saving a correspondence between an identifier of the third image and the second sequence information; and wherein, after the splicing the at least two second images into the third image, the method further comprises:

receiving from a terminal a first request for recovering the first image from the third image, wherein the first request contains identity information of a user and the identifier of the third image;

judging whether the identity information of the user is preset identity information; and querying the second sequence information corresponding to the identifier of the third image according to the correspondence between the identifier of the third image and the second sequence information if the identity information of the user is preset identity information, and sending the second sequence information obtained from the query to the terminal.

2. The method of claim 1, wherein, after the splicing the at least two second images into the third image, the method further comprises:

saving a correspondence among an identifier of the first image, the identifier of the third image and the second sequence information.

3. The method of claim 2, wherein, after the splicing the at least two second images into the third image, the method further comprises:

receiving from a terminal a second request for acquiring the first image, wherein the second request contains identity information of a user and the identifier of the first image;

judging whether the identity information of the user is preset identity information;

querying the identifier of the third image and the second sequence information both corresponding to the identifier of the first image according to the correspondence among the identifier of the first image, the identifier of the third image and the second sequence information, if the identity information of the user is the preset identity information; and acquiring the third image according to the identifier of the third image queried, and sending the third image and the second sequence information to the terminal.

4. The method of claim 1, wherein, the splicing the at least two second images into the third image according to the second sequence information comprises:

according to an order contained in the second sequence information, in which the at least two second images are spliced into the third image, splicing the at least two second images into an image, which is subjected to reversible image processing to generate the third image.

5. A method for image processing, comprising:

acquiring a third image and second sequence information, wherein the third image is formed by splicing at least two second images, and the second sequence information contains an order in which the at least two second images are spliced into the third image;

rearranging the order of the at least two second images contained in the second sequence information, to obtain first sequence information which contains an order in which the at least two second images are spliced into a first image, cutting the third image to obtain the at least two second images; and recovering the first image from the third image according to the first sequence information, wherein, the acquiring the third image and the second sequence information comprises:

acquiring a stored third image; and sending to a server a first request for recovering the first image from the third image, wherein the first request carries identity information of a user and an identifier of the third image.

6. The method of claim 5, wherein, the acquiring the third image and the second sequence information comprises:

sending a second request for acquiring the first image to the server, wherein the second request carries identity information of a user and an identifier of the first image; and receiving the third image and the second sequence information from the server in accordance with identity information of the user.

7. The method of claim 5, wherein, the recovering the first image from the third image according to the first sequence information comprises:

performing image recovering processing on the third image;

cutting the third image after image recovering processing, to obtain at least two second images; and recovering the first image from the at least two second images according to an order contained in the first sequence information, in which the at least two second images are spliced into the first image.

8. A device for image processing, comprising:

an acquiring module, configured for acquiring a third image and second sequence information, wherein the third image is formed by splicing at least two second images, and the second sequence information contains an order in which the at least two second images are spliced into the third image;

a second arranging module, configured for rearranging the order of the at least two second images contained in the second sequence information to obtain first sequence information, wherein the first sequence information contains an order in which the at least two second images are spliced into a first image; and a second splicing module, configured for recovering the first image from the third image according to the first sequence information, wherein, the acquiring module comprises:

an acquiring unit, configured for acquiring a stored third image; and a first sending unit, configured for sending to a server a first request for recovering the first image from the third image, wherein the first request carries identity information of a user and an identifier of the third image.

9. The device of claim 8, wherein, the acquiring module comprises:

a second sending unit, configured for sending to the server a second request for acquiring the first image, wherein the second request carries identity information of a user and an identifier of the first image; and a second receiving unit, configured for receiving the third image and the second sequence information from the server.

10. The device of claim 8, wherein, the second splicing module comprises:

a first processing unit, configured for performing image recovering processing on the third image;

a second processing unit, configured for cutting the third image after the image recovering processing, to obtaining at least two second images; and a third processing unit, configured for recovering the first image from the second images according to the order contained in the first sequence information, in which the at least two second images are spliced into the first image.

* * * * *